United States Patent
Chen et al.

(10) Patent No.: US 9,686,254 B2
(45) Date of Patent: Jun. 20, 2017

(54) METHOD, WIRELESS DEVICE, COMPUTER PROGRAM AND COMPUTER PROGRAM PRODUCT FOR ASSISTING ACCESS TO ACCESS PROTECTED SERVICES

(71) Applicant: Telefonaktiebolaget L M Ericsson (publ), Stockholm (SE)

(72) Inventors: Kun Chen, Shanghai (CN); Robbie Ling, Shanghai (CN); Hongxia Long, Kunshan (CN); Jinyang Xie, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 14/652,591

(22) PCT Filed: Apr. 16, 2013

(86) PCT No.: PCT/EP2013/057893
§ 371 (c)(1),
(2) Date: Jun. 16, 2015

(87) PCT Pub. No.: WO2014/095093
PCT Pub. Date: Jun. 26, 2014

(65) Prior Publication Data
US 2015/0334561 A1    Nov. 19, 2015

(30) Foreign Application Priority Data
Dec. 17, 2012 (WO) ................ PCT/CN2012/086766

(51) Int. Cl.
*H04L 29/06* (2006.01)
*H04W 48/14* (2009.01)
(Continued)

(52) U.S. Cl.
CPC ........ *H04L 63/062* (2013.01); *H04L 65/1073* (2013.01); *H04L 65/4076* (2013.01);
(Continued)

(58) Field of Classification Search
CPC . H04L 63/062; H04L 65/1073; H04L 65/406; H04W 4/06; H04W 48/14; H04W 12/04; H04W 12/06
See application file for complete search history.

(56) References Cited

PUBLICATIONS

"3rd Generation Partnership Project; Technical Specification Group Services and System Aspects; 3G Security; Security of Multimedia Broadcast/Multicast Service (MBMS) (Release 11)," 3GPP TS 33.246 V11.0.0, Sep. 2012, 68 pages.
(Continued)

*Primary Examiner* — Mounir Moutaouakil
(74) *Attorney, Agent, or Firm* — Rothwell, Figg, Ernst & Manbeck, P.C.

(57) ABSTRACT

It is presented a method for assisting access to access protected services in a cellular multimedia delivery system. The method is performed in a wireless device and comprises the steps of: obtaining a set of one or more service identifiers, each service identifier being associated with a service; for each service identified by one of the service identifiers, determining if the service is access protected by reading a configuration associated with the service, independent of any delivery method associated with the service; and transmitting, to a key manager server, a request for service keys for all services which have been determined to be access protected. A corresponding wireless device, compute program and computer program product are also presented.

21 Claims, 6 Drawing Sheets

(51) Int. Cl.
*H04W 4/06* (2009.01)
*H04W 12/04* (2009.01)
*H04W 12/06* (2009.01)

(52) U.S. Cl.
CPC ............. *H04W 4/06* (2013.01); *H04W 12/04* (2013.01); *H04W 12/06* (2013.01); *H04W 48/14* (2013.01)

(56) References Cited

PUBLICATIONS

3rd Generation Partnership Project; Technical Specification Group Services and System Aspects; Multimedia Broadcast/Multicast Service (MBMS); Protocols and codecs (Release 11), 3GPP TS 26.346 V11.1.0, Jun. 2012, 168 pages.

International Search Report and Written Opinion issued in corresponding international application No. PCT/EP2013/057893, dated Sep. 9, 2013, 9 pages.

METHOD, WIRELESS DEVICE, COMPUTER PROGRAM AND COMPUTER PROGRAM PRODUCT FOR ASSISTING ACCESS TO ACCESS PROTECTED SERVICES

CROSS REFERENCE TO RELATED APPLICATION(S)

This application is a 35 U.S.C. §371 National Phase Entry Application from PCT/EP2013/057893, filed Apr. 16, 2013, which claims priority Application No. PCT/CN2012/086766, filed Dec. 17, 2012. The above identified applications are incorporated by reference in their entirety.

TECHNICAL FIELD

The invention relates to a cellular multimedia delivery system and in particular to assisting access to access protected services in such a system.

BACKGROUND

Cellular communication systems have become commonplace and are used by a large majority of people for person to person communication. Moreover, to with the increasing use of smartphones, digitally distributed content is increasingly consumed on wireless devices. While a large part of such content, e.g. web content, needs to be directly controllable by the user, media content such as video can in many cases be shared by several users.

In order to increase efficiency for shared media consumption, point-to-multipoint systems such as broadcasting can be used. In this way, network resources are shared between receiving wireless devices to a higher degree. One standard for broadcasting using cellular communication systems is 3GPP MBMS ($3^{rd}$ Generation Partnership Project—Multimedia Broadcast Multicast Service).

In some cases, services provided through point-to-multipoint systems and point-to-point systems are access protected. In this way, access to a particular service can be restricted, e.g. to only those who have subscribed to the service.

3GPP TS 26.346 version 11 describes protocols and codecs for MBMS, including how wireless devices can gain access to access protected services. However, the way in which the wireless device gains access is cumbersome and it would be beneficial if it, in some way, could be made more efficient. This is particularly the case for situations where multiple delivery methods could be used for the same service, where the methods according to the prior art are particularly resource intensive.

SUMMARY

It is an object to improve the distribution of keys required to gain access to access protected services in a cellular multimedia delivery system.

According to a first aspect, it is presented a method for assisting access to access protected services in a cellular multimedia delivery system. The method is performed in a wireless device and comprises the steps of: obtaining a set of one or more service identifiers, each service identifier being associated with a service; for each service identified by one of the service identifiers, determining if the service is access protected by reading a configuration associated with the service, independent of any delivery method associated with the service; and transmitting, to a key manager server, a request for service keys for all services which have been determined to be access protected.

By using a configuration for access protection in association with the service, efficiency is improved in getting keys. The term service key, whenever used in the description and claims, is to be construed as a digital key used, directly or indirectly, to gain access to an access protected service.

The step of transmitting a request for service keys may comprise transmitting a single request comprising all service identifiers associated with services which have been determined to be access protected. Using a single request for all access protected services is particularly useful.

The step of determining if the service is access protected, may comprise reading an access protection indicator directly associated with the service.

The access protection indicator may be part of a user service description.

The method may further comprise the step of: receiving, from the key manager server, service keys for the services which have been determined to be access protected.

The step of receiving service keys may comprise receiving each service key in a separate message.

The method may further comprise the step of storing the access keys in association with the associated service.

The method may further comprise the step of: obtaining service data comprising a set of identifiers, respectively corresponding to a set of key manager servers. In that case, in the step of transmitting the request, the key manager server is a key manager server selected from the set of key manager servers. In other words, the service data comprises pointers, e.g. URIs (Uniform Resource Identifiers) to the key manager servers. In one embodiment, the service data comprising the set of identifiers respectively corresponding to a set of key manager servers is common for a plurality (or optionally all) services in the cellular multimedia delivery system.

In the step of transmitting the request, the key manager server is selected randomly among the set of key manager servers. This provides a load balancing between the key manager servers.

The step of transmitting the request may comprise, when the transmitting fails, repeating the transmitting to another key manager server in the set of key manager servers. In this way, a fault redundancy is achieved between key manager servers, such that a wireless device will attempt to gain access to another key manager server if it becomes unavailable.

According to a second aspect, it is presented a wireless device arranged to assist access to access protected services in a cellular multimedia delivery system. The wireless device comprises: a processor; and a memory storing instructions that, when executed by the processor, causes the wireless device to: receive a set of one or more service identifiers, each service identifier being associated with a service; for each service identified by one of the service identifiers, determine if the service is access protected by reading a configuration associated with the service, independent of any delivery method associated with the service; and transmit, to a key manager server, a request for service keys for all services which have been determined to be access protected.

The memory may be a computer program product.

The instructions to transmit a request for service keys may comprise instructions to transmit a single request comprising all service identifiers associated with services which have been determined to be access protected.

The instructions to determine if the service is access protected may comprise instructions to read an access protection indicator directly associated with the service.

The access protection indicator may be part of a user service description.

The wireless device may further comprise instructions to: receive, from the key manager server, service keys for the services which have been determined to be access protected.

The instructions to receive service keys may comprise instructions to receive each service key in a separate message.

The wireless device may further comprise instructions to store the access keys, in association with the associated service.

The wireless device may further comprise instructions to: obtain service data comprising a set of identifiers, respectively corresponding to a set of key manager servers. In that case, in the instructions to transmit the request, the key manager server is a key manager server selected from the set of key manager servers.

In the instructions to transmit the request, the key manager server may be selected randomly among the set of key manager servers.

The instructions to transmit the request may comprise, when the transmitting fails, repeating the transmitting to another key manager server in the set of key manager servers.

According to a third aspect, it is presented a computer program for assisting access to access protected services in a cellular multimedia delivery system. The computer program comprising computer program code which, when run on a wireless device, causes the wireless device to: receive a set of one or more service identifiers, each service identifier being associated with a service; for each service identified by one of the service identifiers, determine when the service is access protected by reading a configuration associated with the service, independent of delivery method; and transmit, to a key manager server, a request for service keys for all services which have been determined to be access protected.

According to a fourth aspect, it is presented a memory comprising a computer program according to the third aspect and a computer readable means on which the computer program is stored.

The memory may be in the form of a computer program product.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
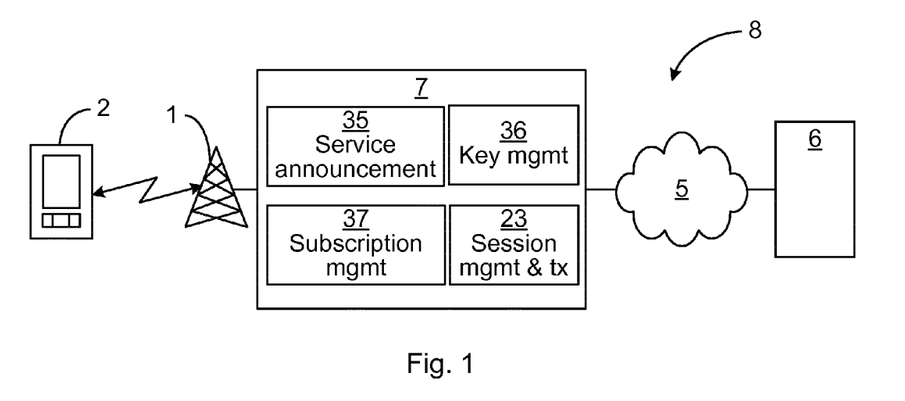
FIG. 1 is a schematic diagram illustrating a cellular multimedia delivery system where embodiments presented herein can be applied.

FIG. 1 is a schematic diagram illustrating a cellular multimedia delivery system 8 where embodiments presented herein may be applied. The cellular multimedia delivery system 8 comprises one or more radio base stations 1, here in the form of E-UTRAN (evolved UMTS (Universal Mobile Telecommunications System) Terrestrial Radio Access Network) NodeBs, also known as eNodeBs or eNBs. The radio base stations 1 could also be in a form to support GERAN (GSM (Global System for Mobile Communications,) EDGE (Enhanced Data rates for GSM Evolution) Radio Access Network), UTRAN, E-UTRAN, or in the form of BTSs (Base Transceiver Stations) and/or BSSs (Base Station Subsystems), etc. The radio base stations 1 provide radio connectivity to a plurality of mobile or fixed wireless terminals 2. The wireless terminals 2 shown here are capable of receiving a broadcast content feed and optionally a unicast content feed. The term wireless terminal is also known as mobile communication terminal, user equipment, mobile terminal, user terminal, user agent, machine-to-machine device etc., and can be, for example, what today are commonly known as a mobile phone or a tablet/laptop with wireless connectivity or fixed mounted terminal.

The cellular multimedia delivery system 8 may e.g. comply with any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), and may also have elements to support wireless local networks, such as the family of IEEE 802.11 x standards (also known as WIFI) or any other current or future wireless network, such as LTE-Advanced, as long as the principles described hereinafter are applicable.

The cellular multimedia delivery system 8 further here comprises a broadcast control system 7. The broadcast control system provides an ability to broadcast content, in a multicast way, i.e. multiple wireless terminals 2 can receive the same content in a point-to-multipoint fashion. This increases network efficiency, e.g. compared to point-to-point streaming, also known as unicast (as opposed to broadcast).

The broadcast control system 7 can comply with any suitable standard, e.g. 3GPP MBMS ($3^{rd}$ Generation Partnership Project Multimedia Broadcast Multicast Service), 3GPP IMB (Integrated Mobile Broadcast), Open Mobile Alliance (OMA) Mobile Broadcast Services Enabler Suite (BCAST), DVB-H (Digital Video Broadcasting—Handheld), DVB-NGH (Digital Video Broadcasting—Next Generation Handheld), or any other current or future broadcast system over wireless networks, as long as the principles described hereinafter are applicable. In this document, embodiments are presented as applied in 3GPP MBMS release 6 or later and/or OMA BCAST version 1.0 or later, but it is to be understood that this does not imply that any other standard is excluded.

The broadcast control system 7 comprises several functions, including a service announcement module 35, a key management module 36, session management and transmission module 23, and a subscription management module 37. These modules can be implemented in hardware and/or software and may be combined in a single piece of hardware or distributed over several hardware entities.

The service announcement module 35 is responsible for presenting available services for wireless devices. This is done by providing service description material to be presented to the end-user, as well as application parameters used to provide service content to the end-user.

The key management module 36 is responsible for providing service keys to wireless devices which are allowed to have access to the corresponding service. The key management module includes two sub-functions: a key request function and a key distribution function. The key request function is responsible for performing MBMS user service registration, deregistration and MSK (MBMS Service Key) request procedures and related user authentication using a MRK (MBMS Request Key), providing a MUK (MBMS User Key) to the key distribution function, and performing authorization checks. The key distribution function is responsible for retrieving the MUK from a registration function, generating and distributing MSKs and MTKs (MBMS Traffic Keys) to the wireless terminal, providing MTK to the session and transmission function. If the MBMS user service does not require any MBMS data protection, then the wireless terminal does not register for key management purposes.

The subscription management module 37 is responsible for presenting what services a particular wireless device 2 subscribes to. Also, the subscription management module 37 is responsible for user service subscribe/unsubscribe events, and verifying if a user is authorized to register and receive keys.

The session and transmission module 23 transfers the actual broadcast session data to the group of UEs using either broadcast bearer Services or unicast bearer services.

One or more content providers 6 (also known as service providers) are also connected to the broadcast control system 7, optionally via a wide area network 5 such as the Internet. In this way, the wireless terminal 2 can receive broadcast content from the broadcast control system 7, originated from the content providers 6. The content which is broadcast from the content providers 6 can e.g. comprise video content and/or audio content, and any other multimedia content. Optionally, the broadcast content is encrypted, whereby the wireless terminal needs to obtain a service key to decrypt the content key, then using content key to decrypt content. This is described in more detail below.

In order not to obscure the concepts presented herein, other (sometimes optional) network nodes such as Radio Network Controller, GGSN (Gateway GPRS (general packet radio service) support node), SGSN (serving GPRS support node), PGW (Packet Data Network Gateway), or other components, e.g. related to GERAN, UTRAN, E-UTRAN are omitted from the cellular multimedia delivery system 8 of FIG. 1, but may be used as needed during operation.

Figure 2:
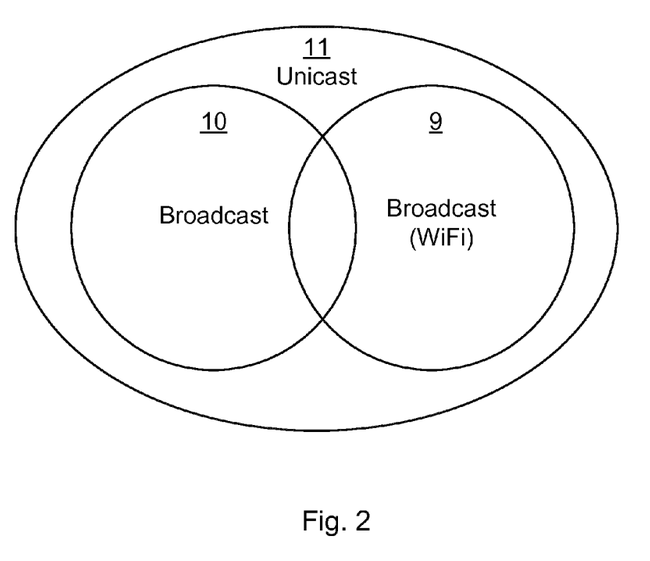
FIG. 2 is a schematic diagram illustrating various delivery methods in the cellular multimedia delivery system of FIG. 1.

FIG. 2 is a schematic diagram illustrating various delivery methods in the cellular multimedia delivery system of FIG. 1. It is shown here that some physical areas may be covered with broadcast using MBMS 10, some physical areas may be covered with broadcast using WIFI 9, while all areas are covered with unicast 11. Unicast can e.g. be streaming over a point to point data connection between the content provider and the wireless terminal.

Broadcast over MBMS 10 is then one delivery method, broadcast over WIFI 9 is then another delivery method and unicast 11 is another delivery method. In at least some cases, the same content can be delivered using multiple delivery methods, which is denoted a hybrid solution for multimedia delivery. In such a situation, the same service key and content key can be used for either delivery method, whereby a wireless terminal would not need a new service key if it moves from an area of MBMS broadcast 10 coverage to an area of WIFI broadcast 9 coverage, or move outside the broadcast area coverage to an area of unicast 11 coverage.

The service key is any suitable digital key, such as a random or pseudo-random string which the wireless terminal 2 can use to gain access to access protected content. For example, the content can be encrypted (also known as scrambled) by the content key, and the service key can be a random (or pseudo-random) string generated by the key management system. The service key which can be used by the wireless terminal 2 to decrypt the content key, and then the UE use the content key to descramble the content.

Figure 10:
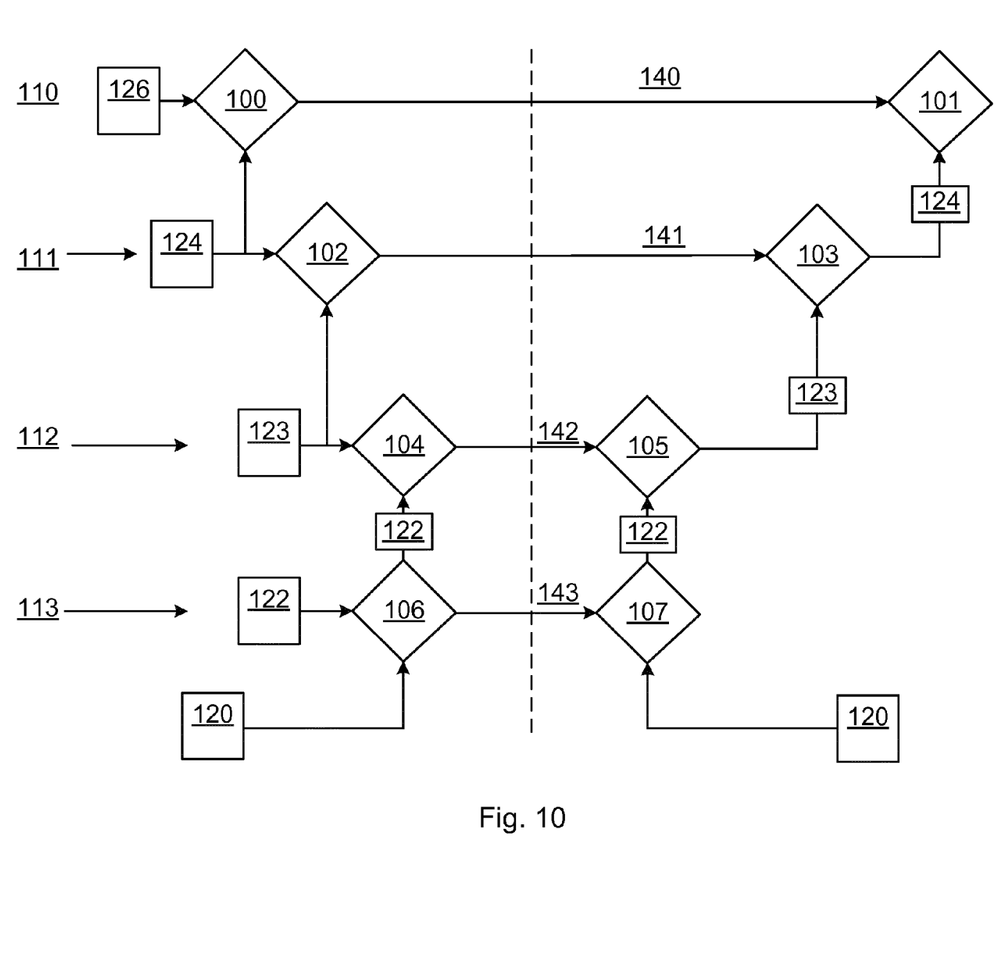
FIG. 10 is a schematic diagram illustrating a four layer key structure which can be used in the system shown in FIG. 1.

FIG. 10 is a schematic diagram illustrating a four layer key structure which can be used in the system shown in FIG. 1. In the OMA document "Service Guide for Mobile Broadcast Services", version 1.0, a four layer key structure is shown A communication channel 150 is provided between the broadcast control system 7 (optionally comprising parts of the content provider 6) and the wireless terminal 2.

The key structure comprises four layers, from bottom up: layer one 113, layer two 112, layer three in and layer four 110.

In layer four 110, a content key (also known as traffic encryption key) 124 is applied to the actual content 126. This depends on various mechanisms depending on the actual encryption method used. The encrypted content 140 could be delivered using any suitable delivery method. There is thus an encryption function 100 and a corresponding decryption function 101.

In layer three 111, Content keys could be delivered over broadcast or interactive channel. A content key 141 encrypted with a service key 123 by a content key message generation function 102 is sent to a content key message decryption function 103 of the wireless terminal 2, together with the identifiers that allow the content key 141 to be linked with the encrypted content 140.

In layers one 113 and two 112, a key management system based on symmetric keys may be used, based on the symmetric key model used by both 3GPP MBMS and 3GPP2 BCMCS (Broadcast and Multicast Services) security models, or other key management systems that may be specified in further releases. For example, a service key message issuing function 104 issues a service key message 142 based on a service key 123 and a layer one key 122 such as a rights encryption key or subscriber management key from a registration data issuing function 106. The wireless terminal 2 receives the service key message in a service key message decryption function 105 and, also using the layer one key 122, thereby obtains the service key 123.

In layer one 113, a registration data issuing function 106 sends registration data 143 based on the layer one key 122 and a device key/smartcard key 120, to a registration data decryption function 107 of the wireless terminal 2. The registration data decryption function 107 can thereby obtain the level one layer key 122, using the registration data 143 and the device key/smartcard key 120.

Figure 3:
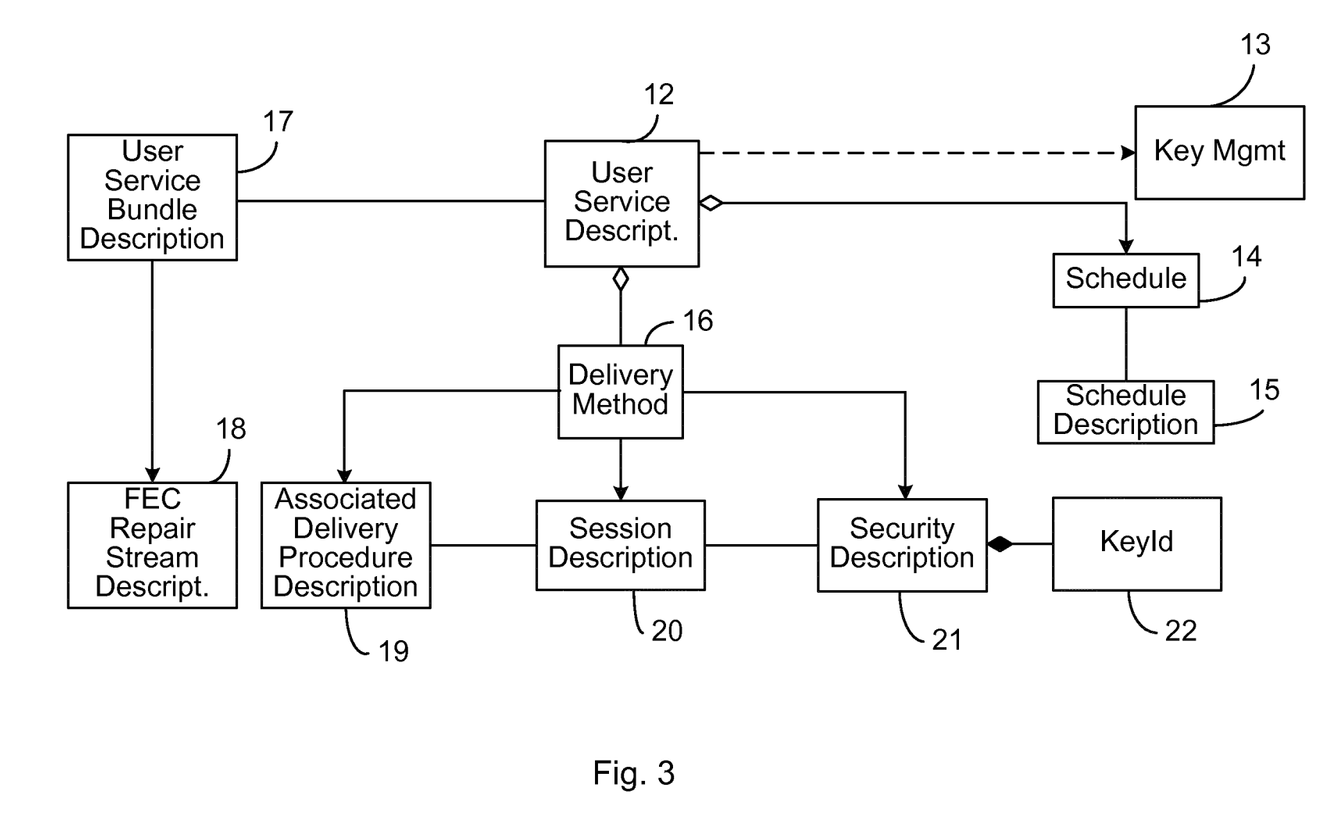
FIG. 3 is a schematic diagram illustrating a data structure according to one embodiment which can be used in the cellular multimedia delivery system of FIG. 1.

FIG. 3 is a schematic diagram illustrating a data structure according to one embodiment which can be used in the cellular multimedia delivery system of FIG. 1. The structure corresponds to a data model shown in FIG. 5 of the MBMS standard 3GPP TS 26.346, release 11, with some modifications.

A main part of the data structure of FIG. 3, is a user service description (USD) 12. The user service description 12 represents a single content service. This user service description 12 comprises an access protection indicator, which indicates if the service identified in the user service description 12 is access protected. It is to be noted that the indicator could be of any suitable format, e.g. a one bit flag, or an implicit indicator by the presence or absence of other parameter or parameters. There are one or more delivery methods 16 associated with the user service description 12. Each delivery method 16 can be associated with a security description 21. Each service description 21 is associated with at least one Key Id 22.

Moreover, each user service enabling the service access protection can be associated with a key management fragment 13, which comprises key data attributed to the Content Delivery System (could include both broadcast and unicast). The key data can comprise a set of identifiers corresponding to a set of key manager servers and some additional attributes, for example a random time for uniform distribution. These key manager servers are used to obtain service keys for one or more services. The key management fragment 13 is common for all services There are also data fragments for session description 20, associated delivery procedure description 19, user service bungle description 17, FEC (Forward Error Correction) repair stream description 18, schedule 14 and schedule description 15.

Figure 4:
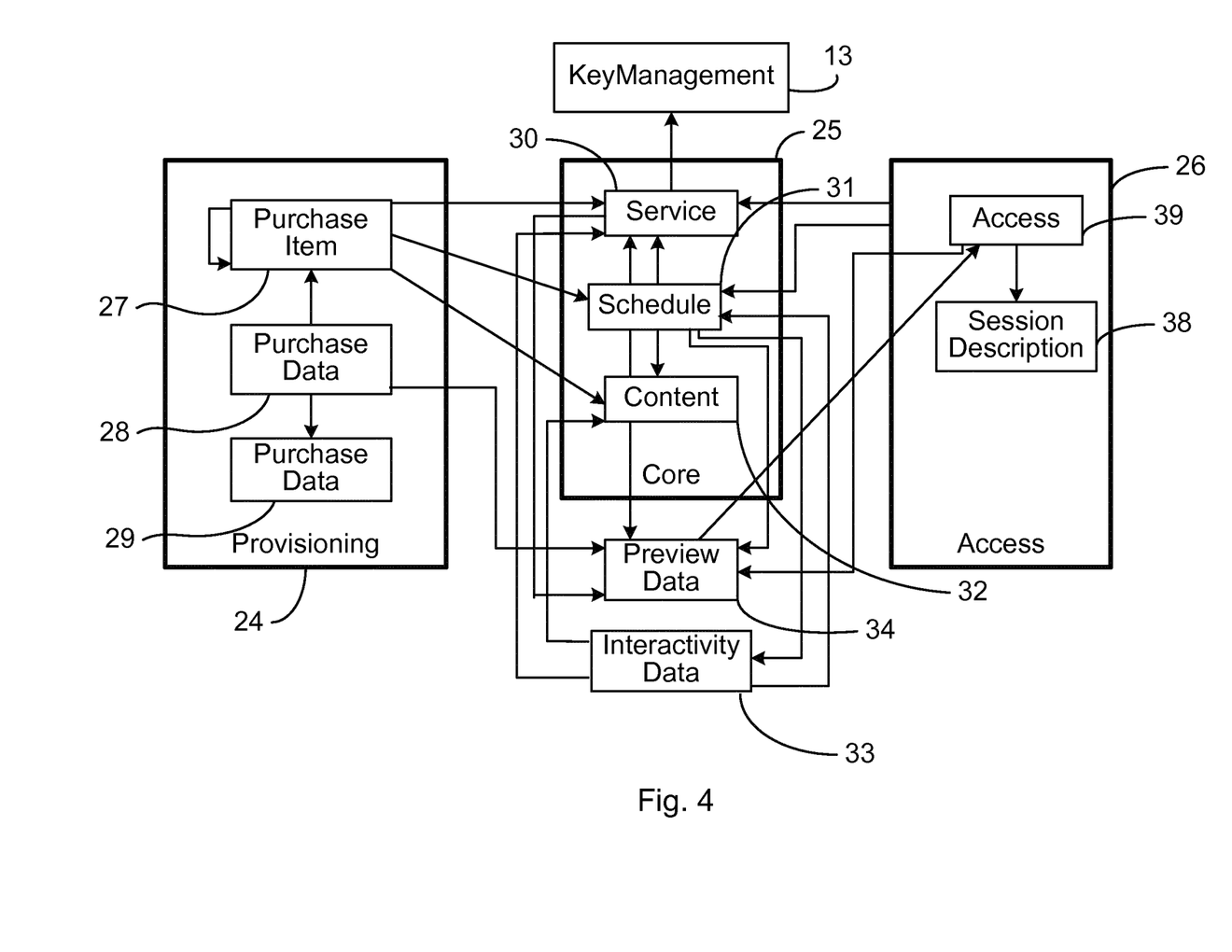
FIG. 4 is a schematic diagram illustrating a data structure according to one embodiment which can be used in the cellular multimedia delivery system of FIG. 1.

FIG. 4 is a schematic diagram illustrating a data structure according to one embodiment which can be used in the cellular multimedia delivery system of FIG. 1. The structure corresponds to a data model shown in FIG. 1 of the OMA document "Service Guide for Mobile Broadcast Services", version 1.0, with some modifications.

A provisioning set 24 contains a purchase item fragment 27, a purchase data fragment 28 and a purchase data fragment 29. A core set 25 contains a service fragment 30, a schedule fragment 31 and a content fragment 32. The service fragment 30 comprises an access protection indicator, which indicates if the service identified in the service fragment 30 is access protected.

An access set 26 comprises an access fragment 39 and a session description fragment 38. Moreover, there are a preview data fragment 34 and an interactivity data fragment 33.

Roughly, the service fragment 30 corresponds to the user service description 12 of FIG. 3 and the access fragment 26 corresponds to the delivery method 16 of FIG. 3. Also here, there is a key management fragment 13, corresponding toe the key management fragment 13 of FIG. 3.

Figure 5:
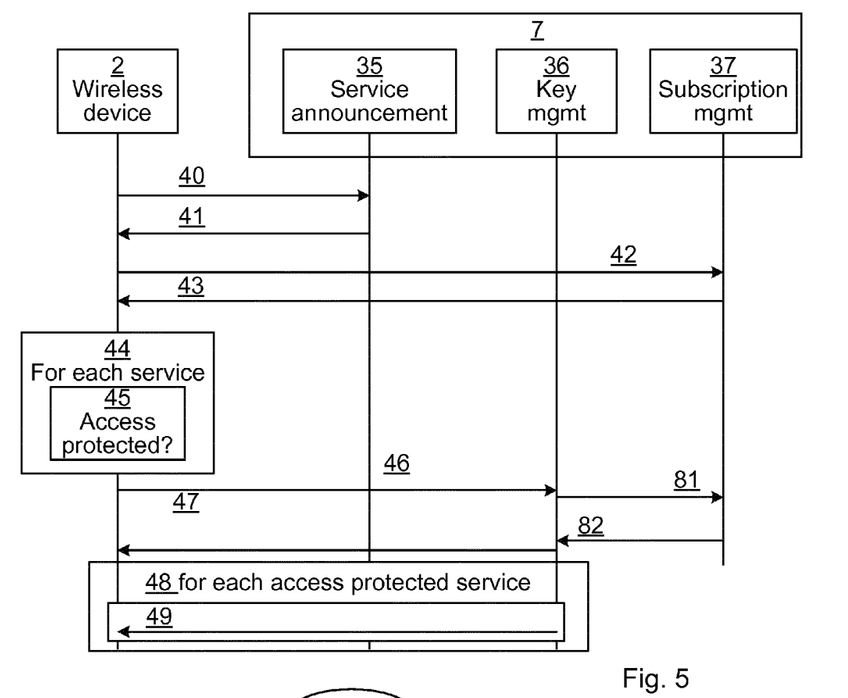
FIG. 5 is a sequence diagram illustrating communication for assisting access to protected services in the cellular multimedia delivery system of FIG. 1.

FIG. 5 is a sequence diagram illustrating communication for assisting access to protected services in the cellular multimedia delivery system of FIG. 1. The sequence diagram illustrates communication between the wireless device 2, the service announcement module 35, the key management module 36 and the subscription management module 37 of FIG. 1, to make the wireless device 2 get access to one or more access protected services.

The communication shown in FIG. 5 can occur using any suitable access technology and protocol, such as HTTP (Hypertext Transfer Protocol) over TCP/IP (Transmission Control Protocol/Internet Protocol).

Initially in this sequence, the wireless device 2 requests 40 the service data related to the service, such as the data structures shown in FIG. 3 and/or 4 from the service announcement module 35. This service data is sent 41 in a response from the service announcement module 35 to the wireless device 2.

The wireless device 2 then requests 42, from the subscription management module 37, a subscription list. In response to this request, the subscription management module 37 responds 43 with the subscription list to the wireless device 2. The subscription list comprises a list of service ids to which the user of the wireless device subscribes.

The wireless device 2 then loops 44 through all the services of the subscription list and, for each one, reads the data structure of the service data for the service to determine 45 whether the service in question is access protected. For example, this can be done by reading the access protection indicator associated with the service. It is to be noted that, at this stage, the wireless device does not need to consider what delivery method or access technology is used for the wireless device 2 to later receive the service.

When the wireless device 2 has determined which services are access protected, the wireless device sends 46 a key registration request to the key management module 36. The key registration request is optionally a single request comprising all service identifiers associated with services which have been determined to be access protected. The key management module 36 then sends the service identifiers 81 to the subscription management module 37 to check whether this particular user has is authorised to obtain the keys for the requested services. The subscription management module 37 responds with a message 82 comprising only the authorised services identifiers to the key management module 36.

The key management server 36 responds 47 with an acknowledgement, such as an OK message with the authorized services' identifiers. The key management module 36 then loops 48 through all of the access protected services, indicated in the key registration request and authorised by the subscription management module 37, and sends 49 an service key for each one to the wireless device 2. At this point, the wireless device 2 has received all service keys for the access protected services to which it subscribes in an efficient way, regardless or delivery method/access technology. Hence, the wireless device 2 can receive access protected content in any suitable way (e.g. unicast, broadcast, etc.) and will not need to retrieve any new access keys.

Figure 6:
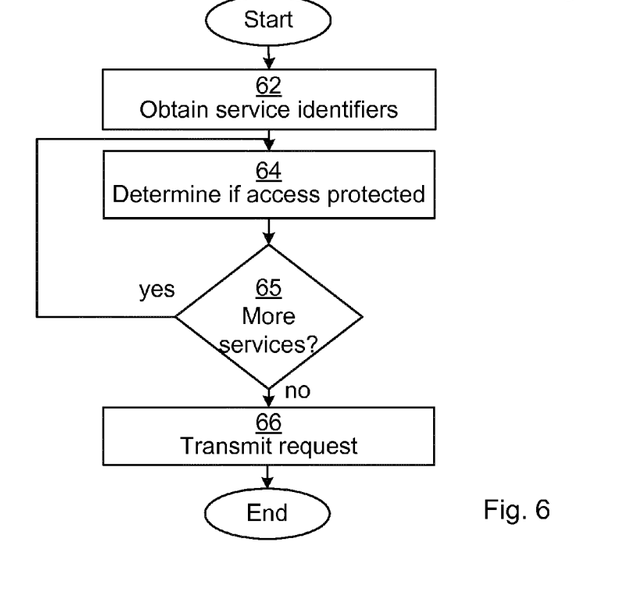
FIG. 6 is a flow chart illustrating a method for assisting access to protected services in the cellular multimedia delivery system of FIG. 1 according to one embodiment.

FIG. 6 is a flow chart illustrating a method for assisting access to protected services in the cellular multimedia delivery system of FIG. 1 according to one to embodiment. The method is performed in the wireless device and corresponds to the wireless device actions of the sequence diagram of FIG. 5.

In an initial obtain service identifiers step 62, a set of one or more service identifiers are received, where each service identifier is associated with a service. This step corresponds to the subscription list sent 43 by the subscription management module 37 in FIG. 5.

In a determine if access protected step 64, the wireless device examines one service, in the set of one or more services, and determines if the service is access protected. This is done by reading a configuration associated with the service, independent of any delivery method associated with the service, such as the key management fragment 13 of FIGS. 3 and 4. Optionally, this involves reading an access protection indicator which is directly associated with the service. For example, the access protection indicator may be part of the user service description (12 of FIG. 3).

In a conditional more services step 65, the wireless device determines if there are more services in the set of one or more services for which the presence of access protection has not been determined. If this is the case, the method returns to the determine if access protected service step 64. Otherwise, the method continues to a transmit request step 66.

In the transmit request step 66, the wireless device transmits, to a key manager server which is optionally randomly selected from the key manager server list in key management fragment 13 in FIG. 4 or FIG. 5, a request for service keys for all services which have been determined to be access protected. This step corresponds to the sending 46 of the key registration request in FIG. 5. Optionally, a single request is transmitted comprising all service identifiers associated with services which have been determined to be access protected.

Figure 7:
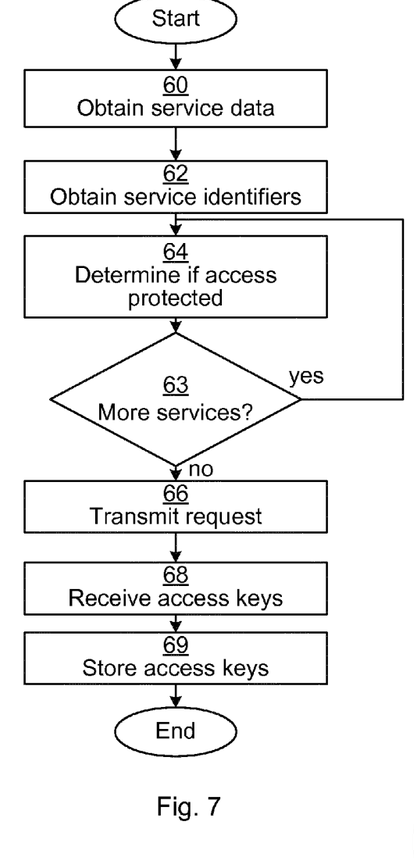
FIG. 7 is a flow chart illustrating a method for assisting access to protected services in the cellular multimedia delivery system of FIG. 1 according to one embodiment.

FIG. 7 is a flow chart illustrating a method for assisting access to protected services in the cellular multimedia delivery system of FIG. 1 according to one embodiment. The method is similar to the method described with reference to to FIG. 6 and the steps shown in FIG. 6 will not be described again unless they differ from the steps of FIG. 6.

In an initial obtain service data step 60, the wireless device requests and receives service data from the service announcement module 35. This step corresponds to the request 40 and response 41 of FIG. 5 related to the data structures. Optionally, the service data comprises a set of identifiers, respectively corresponding to a set of key manager servers. Each one of the key manager servers comprises a key management module (36 of FIGS. 1 and 5).

In an obtain service identifiers step 62, the wireless device requests and receives the set of service identifiers corresponding to the services to which the wireless device 2 subscribes. This step corresponds to the request 42 and response 43 of FIG. 5 related to the subscription list.

When, in the obtain service data step 60, service data has been received comprising the set of identifiers corresponding to the set of key manager servers, the step of transmitting 60 the request transmits the request to a key manager server selected from the set of key manager servers. Optionally, the key manager server is selected randomly among the set of key manager servers. This allows for better balancing of load between a plurality of key manager servers. Also optionally, if the transmitting fails (e.g. determined using the TCP protocol), the transmitting is repeated to another key manager server in the set of key manager servers. In this way a redundancy between key manager servers is achieved.

After the transmit request step 66, there is here a receive service keys step 68. In the receive service keys step 68, the wireless device receives, from the key manager server, service keys for the services which have been determined to be access protected. This step corresponds to the key management module sending 49 service keys in FIG. 5. In other words, the wireless device 2 may receive one or more service keys in this step. Optionally, the service keys are received with each service key in a separate message.

In a store service keys step 69, the service keys which have been received are stored in association with the associated service. This allows the service keys to be used in the future whenever the need arises, regardless of delivery method/access technology. The key can be stored in a data memory (see 59 in FIG. 8).

Figure 8:
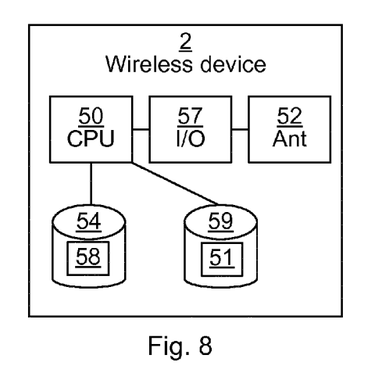
FIG. 8 is a schematic diagram illustrating some components of the wireless device of the cellular multimedia delivery system of FIG. 1.

FIG. 8 is a schematic diagram illustrating some components of the wireless device 2 of the cellular multimedia delivery system of FIG. 1. A processor 50 is provided using any combination of one or more of a suitable central processing unit (CPU), multiprocessor, microcontroller, digital signal processor (DSP), application specific integrated circuit etc., capable of executing software instructions contained in a computer program 58 stored in a memory 54, e.g. in a computer program product, but not in the form of a signal or any form of electromagnetic wave. The processor 50 can be configured to execute the methods described with reference to FIGS. 6 and 7 above.

The memory 54 is here a memory being any combination of read-and-write memory (RAM) and read-only-memory (ROM). The memory 54 also comprises persistent storage, which, for example, can be any single one or combination of magnetic memory, optical memory, solid state memory or even remotely mounted memory. The processor 50 controls the general operation of the wireless device 2.

The wireless device 2 further comprises a data memory 59, which is a read-and-write memory. The data memory 59 may also comprise persistent storage, which, for example, can be any single one or combination of magnetic memory, optical memory, solid state memory or even remotely mounted memory. Optionally, the memory 54 mentioned above and the data memory 59 can form part of the same memory device. The data memory can e.g. store service keys 51 which are used by the wireless device to gain access to access protected services. In one embodiment, the part of the data memory containing the service keys 51 is a secure memory, such as on a UICC (Universal Integrated Circuit Card) of the wireless device.

The wireless device 2 further comprises an I/O interface 57 and an antenna 52 for wireless communication with external entities, e.g. the broadcast control system 7 of FIGS. 1 and 5. The I/O interface 57 also comprises user interface elements (not shown). Other components of the wireless device 2 are omitted in order not to obscure the concepts presented herein.

Figure 9:
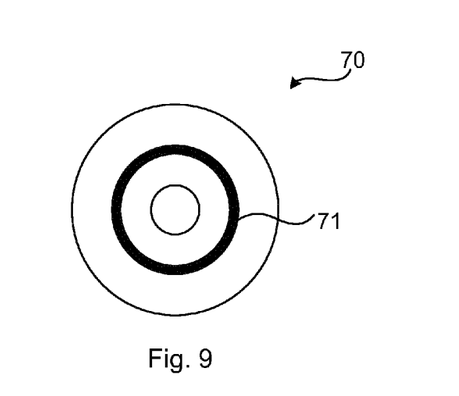
FIG. 9 shows one example of a computer program product comprising computer readable means.

FIG. 9 shows one example of a computer program product 70 comprising computer readable means. On this computer readable means a computer program 71 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 8. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting access to access protected services in a cellular multimedia delivery system, the method being performed in a wireless device and comprising the steps of:
   the wireless device transmitting a request for service data;
   the wireless device receiving a response to the request for service data, which response comprises the requested service data;
   the wireless device storing the received service data;
   the wireless device transmitting a request for service identification information identifying services to which a user of the wireless device is subscribed;
   the wireless device receiving a response to the request for service identification information, the response to the request for service identification information comprising a first service identifier identifying a first service to which the user is subscribed;
   the wireless device obtaining the first service identifier from the response to the request for the service identification information;
   the wireless device using the obtained first service identifier to obtain, from the stored service data, first service configuration information associated with the first service identifier;
   the wireless device using the obtained first service configuration information to determine whether the first service is access protected; and
   the wireless device, as a result of determining that the first service is access protected, transmitting, to a key manager server, a message requesting a service key for the first service, wherein
   the response to the request for service identification information further comprises a second service identifier identifying a second service to which the user is subscribed,
   the method further comprises: i) the wireless device using the second service identifier to obtain, from the stored service data, second service configuration information associated with the second service identifier and ii) the wireless device using the obtained second service configuration information to determine that the second service is access protected, and
   the message transmitted to the key manager server further requests a service key for the second service.

2. The method of claim 1, wherein the step of determining if the first service is access protected comprises reading an access protection indicator directly associated with the first service.

3. The method of claim 2, wherein the access protection indicator is part of a user service description.

4. The method of claim 1, further comprising the wireless device receiving a key response message transmitted the key manager server, said key response message comprising the service key for the first service.

5. The method of claim 1, further comprising:
   the wireless device receiving a first key response message transmitted the key manager server, said first key response message comprising the service key for the first service, and
   the wireless device receiving a second key response message transmitted the key manager server, said second key response message comprising the service key for the second service.

6. The method of claim 5, further comprising:
   storing the first service key in association with the first service, and
   storing the second service key in association with the second service.

7. The method of claim 1, further comprising, prior to transmitting the message to the key manager server, the wireless device selects the key manager server from a plurality of available key manager servers.

8. The method of claim 7, wherein selecting the key manager server from the plurality of available key manager servers comprises randomly selecting the key manager server.

9. The method of claim 7, further comprising: i) the wireless device selecting another key manager server from the plurality of available key manager servers and ii) the wireless device transmitting to the another key manager server the message requesting the service key for the first service.

10. A wireless device arranged to assist access to access protected services in a cellular multimedia delivery system, the wireless device comprising:
    a processor; and
    a memory coupled to the processor, wherein the wireless device is configured to:
    transmit a request for service data;
    store service data received in response to the request for the service data;
    transmit a request for service identification information identifying services to which a user of the wireless device is subscribed;
    obtain a service identifier from a response to the request for the service identification information, the service identifier identifying a service to which the user is subscribed;
    use the obtained service identifier to obtain, from the stored service data, service configuration information associated with the service identifier;
    use the obtained service configuration information to determine whether the service identified by the service identifier is access protected; and
    as a result of determining that the service identified by the service identifier is access protected, transmit, to a key manager server, a request for a service key for the service identified by the service identifier, wherein
    the response to the request for service identification information further comprises a second service identifier identifying a second service to which the user is subscribed,
    the wireless device is further configured to: i) use the second service identifier to obtain, from the stored service data, second service configuration information associated with the second service identifier and ii) use the obtained second service configuration information to determine that the second service is access protected, and the message transmitted to the key manager server further requests a service key for the second service.

11. The wireless device of claim 10, wherein the memory is a computer program product.

12. The wireless device of claim 10, wherein the wireless device is configured to determine if the first service is access protected by reading an access protection indicator directly associated with the service.

13. The wireless device of claim 12, wherein the access protection indicator is part of a user service description.

14. The wireless device of claim 10, wherein the wireless device is adapted to receive a key response message transmitted the key manager server, said key response message comprising the service key for the first service.

15. The wireless device of claim 14, wherein
the wireless device is further adapted to receive a first key response message transmitted the key manager server, said first key response message comprising the service key for the first service, and
the wireless device is further adapted to receive a second key response message transmitted the key manager server, said second key response message comprising the service key for the second service.

16. The wireless device of claim 10, wherein the wireless device is further configured to: i) store the first service key in association with the first service, and ii) store the second service key in association with the second service.

17. The wireless device of claim 10, wherein
the wireless device is further configured such that, prior to transmitting the message to the key manager server, the wireless device selects the key manager server from a plurality of available key manager servers.

18. The wireless device of claim 17, wherein the wireless device is configured to select the key manager server from the plurality of available key manager servers by randomly selecting the key manager server.

19. The wireless device of claim 17, wherein
the wireless device is further configured to: i) select another key manager server from the plurality of available key manager servers and ii) transmit to the another key manager server the message requesting the service key for the first service.

20. A computer program product for assisting access to access protected services in a cellular multimedia delivery system, the computer program product comprising a non-transitory computer readable medium storing computer program code which, when run on a wireless device, causes the wireless device to:
transmit a request for service data;
store service data received in response to the request for the service data;
transmit a request for service identification information identifying services to which a user of the wireless device is subscribed;
obtain a service identifier from a response to the request for the service identification information, the service identifier identifying a service to which the user is subscribed;
use the obtained service identifier to obtain, from the stored service data, service configuration information associated with the service identifier;
use the obtained service configuration information to determine whether the service identified by the service identifier is access protected; and
as a result of determining that the service identified by the service identifier is access protected, transmit, to a key manager server, a request for a service key for the service identified by the service identifier, wherein
the response to the request for service identification information further comprises a second service identifier identifying a second service to which the user is subscribed,
the computer code further comprises code for configuring the wireless device to: i) use the second service identifier to obtain, from the stored service data, second service configuration information associated with the second service identifier and ii) use the obtained second service configuration information to determine that the second service is access protected, and
the message transmitted to the key manager server further requests a service key for the second service.

21. The computer program product of claim 20, wherein the computer program code further causes the wireless device to further store keys received from the key manager server.

* * * * *